United States Patent [19]

Harandi

[11] Patent Number: 4,879,424

[45] Date of Patent: Nov. 7, 1989

[54] CONVERSION OF ALKANES TO GASOLINE

[75] Inventor: Mohsen N. Harandi, Lawrenceville, N.J.

[73] Assignee: Mobil Oil Corporation, New York, N.Y.

[21] Appl. No.: 246,392

[22] Filed: Sep. 19, 1988

[51] Int. Cl.$^4$ ............................................. C07C 2/12
[52] U.S. Cl. ................................... 585/322; 585/330; 585/407; 585/415; 585/440; 585/533; 585/660
[58] Field of Search ............... 585/312, 313, 322, 324, 585/412, 415, 424, 430, 440, 660, 533, 330

[56] References Cited

U.S. PATENT DOCUMENTS

| | | | |
|---|---|---|---|
| 2,992,283 | 7/1961 | Eng et al. | 585/257 |
| 3,761,389 | 9/1973 | Rollmann | 208/64 |
| 3,827,968 | 8/1974 | Givens et al. | 208/49 |
| 4,180,689 | 12/1979 | Davies et al. | 585/407 |
| 4,329,532 | 5/1982 | Conn et al. | 585/407 |
| 4,347,394 | 8/1982 | Detz et al. | 585/419 |
| 4,511,747 | 4/1985 | Wright et al. | 585/313 |
| 4,528,412 | 7/1985 | Steacy | 585/415 |
| 4,642,402 | 2/1987 | Jensen | 585/411 |
| 4,675,461 | 6/1987 | Owen et al. | 585/415 |
| 4,749,820 | 6/1988 | Kuo et al. | 585/415 |
| 4,774,376 | 9/1988 | Hall | 585/312 |
| 4,788,364 | 11/1988 | Harandi | 585/322 |
| 4,788,366 | 11/1988 | Harandi et al. | 585/415 |
| 4,808,295 | 2/1989 | Nemet-Mavrodin | 585/412 |
| 4,822,477 | 4/1989 | Avidan et al. | 585/533 |

FOREIGN PATENT DOCUMENTS 0202000 11/1986 European Pat. Off. ............ 585/322

OTHER PUBLICATIONS

S. M. Csicsery, "Dehydrocyclodimerization", Ind. Eng. Chem. Process Des. Dev., vol. 18, No. 2 (1979), pp. 191–197.

Primary Examiner—Anthony McFarlane
Attorney, Agent, or Firm—Alexander J. McKillop; Charles J. Speciale; Robert B. Furr Jr.

[57] ABSTRACT

A moving-bed catalytic process is disclosed for converting $C_2$–$C_{10}$ aliphatic hydrocarbons to high-octane gasoline. By controlling the reaction severity in sequential reaction zones, yield of high quality gasoline is increased.

19 Claims, 1 Drawing Sheet

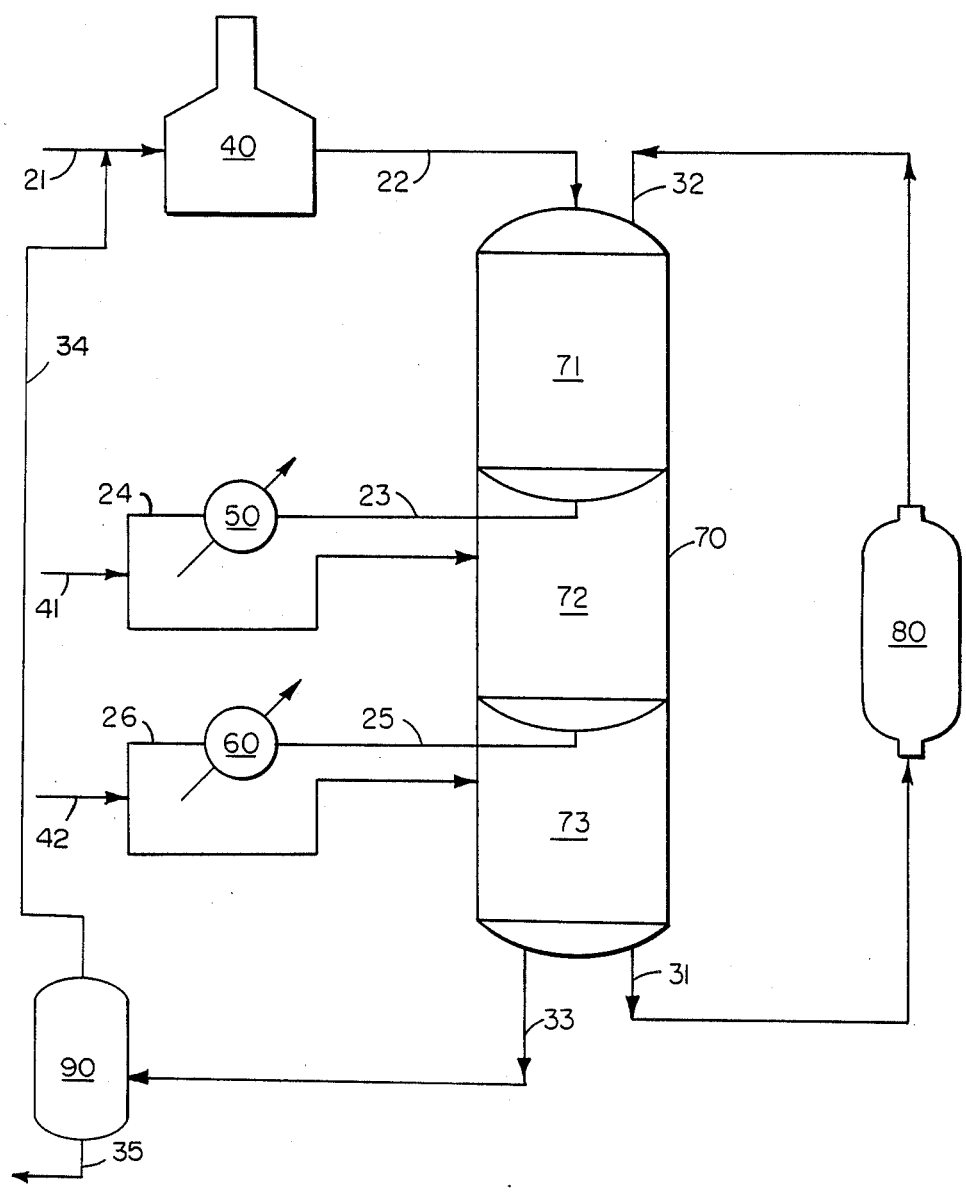

CONVERSION OF ALKANES TO GASOLINE

CROSS-REFERENCE TO RELATED APPLICATIONS

This application is related to commonly-assigned U.S. application Ser. No. 137,112, filed Dec. 22, 1987.

FIELD OF THE INVENTION

The subject invention relates to a hydrocarbon conversion process. Specifically, the subject invention relates to a catalytic aromatization/oligomerization process in which two or more molecules of a light aliphatic hydrocarbon, such as propane or propylene, are joined together to form a high quality aromatic gasoline product. The invention specifically relates to a moving-bed catalytic process to increase the yield of high-octane gasoline product obtained from the aromatization of an aliphatic hydrocarbon feedstream.

BACKGROUND OF THE INVENTION

In a modern petroleum refinery several process units generate hydrocarbon by-products of low commercial value. Side streams comprising lower molecular weight paraffins are generally low in value and often burned as a source of fuel.

Efforts to upgrade hydrocarbon streams containing $C_2$–$C_{10}$ paraffins have included contacting the paraffins under high severity dehydrocyclization conditions with a crystalline shape selective medium pore siliceous acid catalyst in a fluidized bed reaction zone to obtain aromatic hydrocarbons. Such an operation provides a convenient one-step route for producing an aromatics-rich gasoline with a relatively high octane number.

Givens U.S. Pat. No. 3,827,968 (et al.) discloses a two-stage operation wherein a mixed feed containing paraffins and olefins is upgraded in the absence of added hydrogen to a highly aromatic gasoline product. In a first stage oligomerization reaction, olefins are upgraded to higher molecular weight liquid hydrocarbons under relatively mild conditions with a catalyst having the structure of ZSM-5. In a second stage, said liquid hydrocarbons are converted to an aromatic product. A gas phase highly paraffinic stream is withdrawn as byproduct from the first stage.

Numerous references describe the conversion of light aliphatic hydrocarbons to aromatic hydrocarbons. For instance, J. Eng U.S. Pat. No. 2,992,283 describes the conversion of propylene to a variety of higher molecular weight hydrocarbons using a treated crystalline aluminosilicate as the catalyst. C. M. Detz U.S. Pat. No. 4,347,394 (et al.) describes the conversion of $C_5+$ hydrocarbons to aromatics using a nonacidic zeolite supporting a platinum compound. P. J. Conn U.S. Pat. No. 4,329,532 (et al.) describes the conversion of $C_4$– olefins or mixtures of olefins and paraffins to aromatic hydrocarbons. The catalyst comprises a crystalline silicate having a specified composition, crystallite size range, and X-ray diffraction pattern.

E. E. Davies U.S. Pat. No. 4,180,689 (et al.) describes the conversion of $C_3$–$C_8$ aliphatic hydrocarbons to aromatic hydrocarbons in a process which employs a catalyst comprising gallium supported on an aluminosilicate. L. D. Rollman U.S. Pat. No. 3,761,389 (et al.) describes an improved process for converting hydrocarbons to aromatics over a catalyst having the structure of ZSM-5. The improvement resides in the use of two reaction stages in series, with the first being at more severe operating conditions. P. C. Steacy U.S. Pat. No. 4,528,412 also describes catalyst, reaction zone operations and product recovery methods for dehydrocyclodimerization processes.

Jensen U.S. Pat. No. 4,642,402 describes a process for the conversion of light aliphatic hydrocarbons to aromatics. The improvement resides in recycling benzene recovered from the reaction zone effluent to the reaction zone.

A review of dehydrocyclodimerization is presented at page 191 of Vol. 18, No. 2, 1979 issue of "Industrial Engineering Chemistry: Process Design and Development".

The primary objective of motor gasoline manufacture and of the present invention is to maximize production of high-octane gasoline. It is widely known that yield and octane increase are inversely related for a given hydrocarbon feedstream. Consequently, the effectiveness of a particular upgrading process can be expressed in terms of octane-barrels per day. The index "octane-barrels per day" is defined as follows:

$$\text{octane-barrels per day} = \frac{\text{(Octane Number) (Barrels of product produced)}}{\text{(Number of days on stream)}}$$

The primary object of the present invention is to maximize the octane-barrels per day produced by the conversion of an aliphatic hydrocarbon feedstock. The aromatics liquid product usually contains at least 70% aromatics with a distribution of aromatics product such that toluene usually predominates with significant quantities of benzene and $C_8$ aromatics together with somewhat lower quantities of $C_9+$ aromatics. From a gasoline additive product value point of view, the lower alkyl substituted aromatics are to be preferred as compared to the non-substituted benzene because they have as high octane values and greater weight and volume per octane number. The present invention provides a process for increasing the production of high octane gasoline by shifting the product distribution from non-substituted benzene to lower alkyl substituted aromatics, for decreasing production of light $C_3$– byproducts, and for balancing the relative yield of aliphatic and aromatic product to maximize product octane-barrels.

SUMMARY OF THE INVENTION

The process of the present invention is a moving-bed catalytic aromatization/oligomerization process for upgrading a $C_2$–$C_6$ aliphatic hydrocarbon stream to a high-octane gasoline stream. An auxilliary feedstream comprising $C_2$–$C_6$ olefinic hydrocarbons can also be added between reaction stages for aromatization/oligomerization.

The present process comprises the steps of charging an aliphatic hydrocarbon feedstock to a first heat exchange unit, withdrawing a heated feedstream, charging said heated feedstream under aromatization conditions to a first reaction zone containing a zeolite catalyst, withdrawing an intermediate stream from said first reaction zone, withdrawing a first stream of at least partially deactivated zeolite catalyst from said first reaction zone, cooling said intermediate stream, charging said cooled intermediate stream to a second reaction zone, charging said partially deactivated zeolite catalyst to said second reaction zone and withdrawing an upgraded gasoline product from said second reaction zone. The invention may further comprise charging an auxilliary olefinic feedstream to the second reaction zone. The auxilliary olefinic feedstream may be charged at a temperature below that of the intermediate product stream as a quench. The invention may further comprise withdrawing an intermediate product from said second reaction zone, withdrawing a second stream of at least partially deactivated zeolite catalyst from said second reaction zone, cooling said second intermediate product stream, charging said second intermediate product stream and said second stream of at least partially deactivated zeolite catalyst to a third reaction zone, and withdrawing a stream of high-octane gasoline from said third reaction zone.

The feedstream is preferably added to the first reaction zone at a temperature between 538° C. and 760° C. (1000° F. and 1400° F.), a pressure between 170 kPa and 2170 kPa (10 psig and 300 psig), and WHSV between 0.3 hr$^{-1}$ and 300 hr$^{-1}$.

The intermediate stream withdrawn from the first reaction zone is preferably cooled to a temperature of between about 149° C. and 288° C. (300° F. and 550° F.) before it is charged to the second reaction zone.

The auxiliary olefinic feedstream is preferably charged to the second reaction zone at a temperature between 38° C. and 288° C. (100° F. and 550° F.).

If a third reaction zone is employed, it is preferable to charge the cooled intermediate product withdrawn from the second reaction zone to the third reaction zone at a temperature between about 149° C. and 288° C. (300° F. and 550° F.).

A second auxiliary olefinic feedstream may be charged to the third reaction zone, preferably at a temperature between about 149° C. and 288° C. (300° F. and 550° F.).

Catalyst is preferably withdrawn from the last sequential reaction zone and regenerated in a continuous catalyst regeneration process. Such regeneration processes are well known to those skilled in the art.

DESCRIPTION OF THE DRAWING

The drawing is a simplified process flow diagram of the moving-bed catalytic aromatization/oligomerization process of the present invention.

DETAILED DESCRIPTION OF THE INVENTION

Processes for the conversion of light aliphatic hydrocarbons to aromatic or nonaromatic $C_6+$ hydrocarbons have been the subject of significant development efforts as evidenced by the previously cited references. The present invention converts a $C_2$–$C_6$ aliphatic hydrocarbon stream with an optionally added $C_2$–$C_6$ olefinic stream into high-octane gasoline. By controlling reaction severity through catalyst deactivation and interstage cooling, the production of branched aliphatics and alkyl-substituted aromatics is favored over benzene production resulting in an economically favorable increase in octane while minimizing yield loss.

While not presented to limit the invention by theory, it is understood that three variables control reaction severity in the present process: temperature, space velocity and catalyst activity. Reaction severity increases with increasing temperature, increasing catalyst activity and decreasing space velocity. More severe reaction conditions favor aromatization, while less severe conditions favor oligomerization.

In a preferred embodiment of the present invention, the sequential reaction zones may contain equal volumes of catalyst or may contain progressively larger volumes of catalyst. Space velocity controls the extent of the reaction. In the first reaction zone, a partial conversion of reactants is desired to maximize olefins and aromatics selectivity. In the subsequent reaction zones, it is desirable to maximize the extent of reaction to provide improved olefins and aromatics selectivity. In the first stage, paraffin conversion is higher than 30% by weight, preferably about 65% by weight. In a preferred configuration, unconverted paraffins are separated from the final stage reactor effluent and recycled to the first stage reactor.

Further, the catalysts useful in the present invention are progressively deactivated by contact with hydrocarbons under conversion conditions. Therefore, at a given temperature and space velocity, reaction zones downstream from the first necessarily provide progressively less severe reaction environments.

Finally, reaction temperature may be varied to control reaction severity. In the moving-bed catalytic process of the present invention, decreasing catalyst activity tends to reduce severity as reactants flow through the sequential reaction zones. In the most preferred embodiment, reaction severity is adjusted to match the feedstream and product requirements by controlling the reaction temperature in each of the sequential reaction zones. Typically, the first reaction zone is maintained at dehydrogenation/aromatization conditions and effluent from the first and subsequent reaction zones is cooled to maintain downstream reaction zones under oligomerization conditions.

The feed compound to the present process is a light aliphatic hydrocarbon stream having from 2 to 6 carbon atoms per molecule. The feed stream may comprise a single compound or a mixture of two or more of these compounds. The preferred feed compounds are propane and the butanes.

The subject invention is directed to increasing the amount of high-octane gasoline produced in a moving-bed catalytic aromatization/oligomerization process. The process of the present invention is preferably carried out in a moving bed multi-stage reactor such as is described in U.S. Pat. Nos. 3,652,231; 3,692,496; 3,706,536; 3,785,963; 3,825,116; 3,839,196; 3,839,197; 3,854,887; 3,856,662; 3,918,930; 3,981,824; 4,094,814; 4,110,081; and 4,403,909. These patents also describe catalyst regeneration systems and various aspects of moving catalyst bed operations and equipment. This reactor system has been widely employed commercially for the reforming of naphtha fractions. Its use has also been described for the dehydrogenation of light paraffins.

The preferred moving catalyst bed reactor system employs a series of stacked reactor units arranged in a vertical column. In a most preferred embodiment, a series of three moving bed radial flow reactor units is arranged in a vertical column. Each of the three reactor units is operatively connected to a heat exchange unit.

Solid catalyst particles contained in a primary reactor unit flow downwardly in co-current relation to a hydrocarbon feedstream and enter a secondary reactor unit in a partially deactivated condition. The solid catalyst particles contained in the secondary reactor unit then pass downwardly to a tertiary reactor unit. From the tertiary reactor unit are withdrawn deactivated solid catalyst particles which are then passed to a continuous catalyst regeneration zone where the particles are reactivated by a known process. The reactivated particles are then recycled to the primary reactor unit for further contact with an aliphatic hydrocarbon stream under dehydrocyclodimerization conditions.

In the preferred embodiment, the aliphatic hydrocarbon feedstock is in continuous co-current contact with solid catalyst particles in each of the three reactor units.

In an additional embodiment of the present process, an auxiliary feedstream comprising oligomerization $C_2$–$C_6$ olefins is added to the cooled effluent from the secondary heat exchange unit prior to addition to the secondary reactor unit. Catalyst particles are withdrawn from the primary reactor unit and added to the secondary reactor unit. Catalyst particles are then withdrawn from the secondary reactor unit, reactivated in a continuous catalyst regeneration unit, and returned to the primary reactor unit.

Alternatively, the process further comprises: withdrawing an intermediate product from the secondary reactor unit; cooling the product in a tertiary heat exchange unit; withdrawing the cooled product; and adding the cooled product to a tertiary reactor unit containing partially deactivated zeolite catalyst particles. It is to be understood that the secondary or the tertiary heat exchange unit can be a heating zone rather than a cooling zone and still be within the scope of the present invention.

It is also possible to operate the present process with a series of four or more reaction zones, each reaction zone comprising a heat exchange unit upstream of and operatively connected to a reactor unit. At least one of the interheaters or heat exchange units is maintained as a cooling zone. This effectively allows for at least one reaction zone to be operated at sufficiently mild conditions. The sufficiently mild conditions cause oligomerization of olefins which were made in a reaction zone operated under severe dehydrogenation/aromatization conditions.

In addition, an auxiliary feedstream comprising oligomerizable $C_2$–$C_6$ olefins can optionally be added to an intermediate effluent stream from at least one heat exchange unit maintained as a cooling zone. The addition of such an auxiliary feedstream to the process allows for an overall increase in gasoline yield.

Process Conditions

In the process of the present invention, it is essential to maintain dehydrogenation/aromatization process conditions in at least one reaction zone and olefin oligomerization process conditions in at least one subsequent reaction zone. The number of dehydrogenation/aromatization zones which precede the oligomerization reaction zones will depend upon, among other factors, the feed composition, catalyst activity, space velocity and reaction temperature.

The dehydrogenation/aromatization zone conditions include pressures between 170 kPa and 2170 kPa (10 psig and 300 psig), temperatures between 538° C. and 816° C. (1000° F. and 1500° F.) and WHSV (weight hourly space velocity) between 0.3 hr$^{-1}$ and 300 hr$^{-1}$. Preferred process conditions for the dehydrogenation/aromatization reaction zone include pressures between 239 kPa and 791 kPa (30 psig and 100 psig), temperatures between 566° C. and 621° C. (1050° F. and 1150° F.) and WHSV between 1 hr$^{-1}$ and 10 hr$^{-1}$.

The oligomerization reaction zone process conditions include temperatures between 340° C. and 538° C. (650° F. and 1000° F.) and WHSV between 0.3 hr$^{-1}$ and 20 hr$^{-1}$. Preferred oligomerization zone process conditions include temperatures between 371° C. and 427° C. (700° F. and 800° F.) and WHSV between 0.5 hr$^{-1}$ and 5.0 hr$^{-1}$. Oligomerization pressures are controlled by the pressure in the upstream dehydrogenation/aromatization reaction zones. Such pressures may be calculated by techniques known to those skilled in the art as equal to the upstream dehydrogenation/aromatization zone pressure less the pressure drop across the process equipment in line between the dehydrogenation/aromatization zone and the oligomerization zone.

Catalysts

The members of the class of zeolites useful herein have an effective pore size of generally from about 5 to about 8 Angstroms, such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a zeolite provides control to molecules of varying sizes to its internal structure is the Constraint Index of the zeolite. The method by which the Constraint Index is determined is described in U.S. Pat. No. 4,016,218, incorporated herein by reference for details of the method. U.S. Pat. No. 4,696,732 discloses Constraint Index values for typical zeolite materials and is incorporated by reference as if set forth at length herein.

The present process employs solid crystalline catalyst particles comprising an aluminosilicate material such as a zeolite. In a preferred embodiment, the catalyst contained in the moving bed reactors comprises a zeolite having the structure of ZSM-5. Examples of such a zeolite are ZSM-5, ZSM-11, ZSM-12, ZSM-35, and mixtures thereof. Most preferably, the catalyst comprises ZSM-5.

Zeolite ZSM-5 and the conventional preparation thereof are described in U.S. Pat. No. 3,702,886, the disclosure of which is incorporated herein by reference. Other preparations for ZSM-5 are described in U.S. Pat. Nos. Re. 29,948 (highly siliceous ZSM-5); 4,100,262 and 4,139,600, the disclosure of these is incorporated herein by reference. Zeolite ZSM-11 and the conventional preparation thereof are described in U.S. Pat. No. 3,709,979, the disclosure of which is incorporated herein by reference. Zeolite ZSM-12 and the conventional preparation thereof are described in U.S. Pat. No. 3,832,449, the disclosure of which is incorporated herein by reference. Zeolite ZSM-23 and the conventional preparation thereof are described in U.S. Pat. No.

4,076,842, the disclosure of which is incorporated herein by reference. Zeolite ZSM-35 and the conventional preparation thereof are described in U.S. Pat. No. 4,016,245, the disclosure of which is incorporated herein by reference. Another preparation of ZSM-35 is described in U.S. Pat. No. 4,107,195, the disclosure of which is incorporated herein by reference.

Gallium-containing zeolite catalysts are particularly preferred for use in the present invention and are disclosed in U.S. Pat. No. 4,350,835 and U.S. Pat. No. 4,686,312, both of which are incorporated by reference as if set forth at length herein.

Zinc-containing zeolite catalysts are useful in the present invention, for example, U.S. Pat. No. 4,392,989 and U.S. Pat. No. 4,472,535, both of which are incorporated by reference as if set forth at length herein.

Catalysts such as ZSM-5 combined with a Group VIII metal described in U.S. Pat. No. 3,856,872, incorporated by reference as if set forth at length herein, are also useful in the present invention.

DESCRIPTION OF THE PREFERRED EMBODIMENTS

Referring to the FIG., an aliphatic feedstream is charged through line 21 to heater 40. The heated feedstream is withdrawn from heater 40 and charged to a cylindrical reactor vessel 70 through line 22. Reactor vessel 70 contains at least two reaction zones. In the preferred embodiment, reactor vessel 70 contains three reaction zones 71, 72 and 73. Regenerated catalyst flows from regenerator unit 80 through line 32 to the first reaction zone 71 inside reactor vessel 70. In each of the three reaction zones, catalyst flows downward and the reactants flow radially outward from central distributors (not shown).

In the first reaction zone 71 the predominate reactions include paraffin dehydrogenation and olefin aromatization. A first intermediate product stream is withdrawn from reaction zone 71 through line 23 and is charged to heat exchanger 50. Partially deactivated catalyst flows downward through reactor vessel 70 into a second reaction zone 72.

Heat exchanger 50 may be operated as a heating or cooling unit depending on the composition of the first intermediate product stream. If sufficient dehydrogenation and aromatization has occurred in the first reaction zone, the subsequent reaction zones may be operated as oligomerization zones. Otherwise, the second reaction zone must be operated at dehydrogenation/aromatization process conditions. If secondary reaction zone 72 is to be operated as an oligomerization zone, heat exchanger 50 is operated as a process cooler. On the other hand, if secondary reaction zone 72 is to be operated as a dehydrogenation/aromatization zone, heat exchanger 50 is operated to increase the temperature of the first intermediate product stream. As can be seen by one skilled in the art, if the first intermediate product stream must be heated, heat exchanger 50 may be replaced with a fired heater or other means for heating the first intermediate product stream.

A first intermediate product stream is cooled when it is desired to maintain subsequent reaction zones as oligomerization zones. Further, if subsequent reaction zones are to be operated as oligomerization reaction zones, a stream of $C_2$-$C_6$ olefins may optionally be added through line 41 to the first intermediate product stream in line 24. The mixture is then charged through line 24 to a secondary reaction zone 72. A second intermediate product stream is withdrawn from reaction zone 72 and charged to process cooler 60 through line 25. The cooled second intermediate product stream flows out of process cooler 60 and may optionally be blended with a second auxilliary charge stream of $C_2$-$C_6$ olefins flowing through line 42. A stream consisting of the cooled second intermediate product stream and optionally a second auxilliary charge stream is charged to tertiary reaction zone 73 through line 26. Partially deactivated zeolite catalyst flows downward from reaction 72 into reaction zone 73.

A gasoline product stream is withdrawn from reaction zone 73 via line 33 and deactivated catalyst is withdrawn and charged to regeneration unit 80 via line 31. Reactivated catalyst then flows from regeneration unit 80 to primary reaction zone 71 through line 32. The gasoline product may subsequently be charged to a separator 90 for recycling unreacted paraffins. Unreacted paraffins flow from separator 90 through line 34 to line 21 where the unreacted paraffins are mixed with fresh feed. The purified gasoline product stream is then routed to storage or further treatment via line 35.

The following example illustrates the process of the present invention.

EXAMPLE

A paraffinic hydrocarbon feedstock comprising FCC light gasoline is contacted under dehydrocyclization conditions with a shape selective acidic metallosilicate zeolite catalyst. The liquid hourly space velocity of the feedstock is increased in stages from 2.5 $hr^{-1}$ to 75 $hr^{-1}$. At increasing LHSV, (decreasing reaction severity), total aromatics production decreases and production of reactive olefins is increased as represented in Table 1 below. Operation of a dehydrocyclization reaction at relatively high LHSV produces an olefinic hydrocarbon product which is then oligomerized in a second stage to obtain high quality gasoline. In addition, gas make is significantly reduced, reaction heat input requirements are reduced, catalyst make-up rate is reduced, benzene concentration in the final gasoline product is reduced, hydrogen purity is increased and product recovery is less expensive.

TABLE 1

| LHSV | 2.5 | 5.0 | 12.5 | 25.0 | 37.5 | 75.0 |
|---|---|---|---|---|---|---|
| (Wt. %) | | | | | | |
| $H_2$ | 1.9 | 1.9 | 1.9 | 1.3 | 1.0 | 0.5 |
| methane | 10.8 | 4.3 | 3.0 | 1.7 | 1.4 | 0.8 |
| ethene | 2.0 | 6.5 | 8.1 | 8.6 | 10.0 | 9.5 |
| ethane | 8.2 | 7.2 | 4.9 | 3.5 | 2.3 | 1.7 |
| propene | 1.5 | 7.6 | 10.2 | 13.5 | 15.7 | 19.2 |
| propane | 9.5 | 11.7 | 11.6 | 11.3 | 10.4 | 8.8 |
| butanes | 1.5 | 6.9 | 7.7 | 13.3 | 14.8 | 14.4 |
| pentanes | 4.3 | 3.2 | 3.8 | 7.8 | 10.4 | 13.5 |
| total aromatics | 60.7 | 51.1 | 48.7 | 39.4 | 34.3 | 26.9 |
| benzene | 14.5 | 12.5 | 8.4 | 5.9 | 5.5 | 3.1 |
| toluene | 30.5 | 25.1 | 22.3 | 17.9 | 15.3 | 14.2 |
| xylenes | 12.1 | 10.8 | 13.2 | 11.8 | 10.3 | 6.5 |
| $C_9+$ aromatics | 3.6 | 2.7 | 4.8 | 3.8 | 3.2 | 3.1 |

Table 2 shows the product selectivity when the two-stage alkane conversion reaction is compared with the conventional one-stage dehydrocyclization reaction. The product selectivity is shown in pounds per hour (Lbs/hr) and barrels per day (BPD).

TABLE 2

|  | One-Stage Reaction | Two-Stage Reaction | | | | | |
|---|---|---|---|---|---|---|---|
| LHSV | 2.5 | 2.5 | 5.0 | 12.5 | 25.0 | 37.5 | 75.0 |
| Lbs/hr | | | | | | | |
| $C_4$ Oligomerized | 150 | 120 | 520 | 640 | 880 | 1010 | 1120 |
| $C_5+$* | 430 | 740 | 1630 | 2000 | 2990 | 3560 | 4240 |
| Benzene | 1440 | 1440 | 1240 | 840 | 590 | 550 | 330 |
| Toluene | 3030 | 3030 | 2490 | 2240 | 1780 | 1520 | 1490 |
| Xylene | 1200 | 1200 | 1070 | 1320 | 1170 | 1030 | 680 |
| $C_9+$ | 360 | 360 | 270 | 480 | 380 | 320 | 330 |
| Total $C_5+$ | 6460 | 6770 | 6700 | 6880 | 6910 | 6980 | 7070 |
| Total $C_4+$ | 6610 | 6890 | 7220 | 7520 | 7790 | 7990 | 8190 |
| BPD | | | | | | | |
| $C_4$ Oligomerized | 17.08 | 14.63 | 61.63 | 75.83 | 104.04 | 118.89 | 132.45 |
| $C_5+$* | 39.91 | 68.68 | 151.29 | 185.63 | 277.52 | 330.42 | 393.54 |
| Benzene | 111.51 | 111.51 | 96.02 | 65.05 | 45.69 | 42.59 | 25.55 |
| Toluene | 238.04 | 238.04 | 195.62 | 175.98 | 139.84 | 119.41 | 117.06 |
| Xylene | 94.48 | 94.48 | 84.24 | 103.93 | 92.12 | 81.10 | 53.54 |
| $C_9+$ | 28.67 | 28.67 | 21.51 | 38.23 | 30.27 | 25.49 | 26.28 |
| Total $C_5+$ | 512.62 | 541.39 | 548.68 | 568.82 | 585.43 | 599.01 | 615.97 |
| Total $C_4+$ | 529.70 | 556.02 | 610.31 | 644.65 | 689.47 | 717.90 | 748.42 |
| $C_5+(R+O)$ | 119.2 | 118.0 | 114.2 | 115.2 | 111.5 | 109.1 | 107.0 |
| $C_5+(M+O)$ | 106.4 | 105.1 | 101.2 | 101.5 | 97.7 | 95.4 | 93.4 |
| $C_5+(ROAD)$ | 112.8 | 111.6 | 107.7 | 108.3 | 104.6 | 102.3 | 100.2 |
| $R+O$* (BBLS/D) | 61103 | 63879 | 62664 | 65502 | 65254 | 65366 | 65927 |

*Includes non-aromatic $C_5+$ made in the first stage reaction plus total $C_5+$ made in the second stage reaction.

Composition of $C_5+$ gasoline product is shown in a comparative fashion in Table 3 for both the conventional one-stage dehydrocyclization reaction and the two-stage alkane conversion reaction of the present invention.

TABLE 3

|  | One-Stage Reaction | Two-Stage Reaction | | | | | |
|---|---|---|---|---|---|---|---|
| LHSV | 2.5 | 2.5 | 5.0 | 12.5 | 25.0 | 37.5 | 75.0 |
| Oligomerized $C_5+$, Vol. % | 7.79 | 12.69 | 27.57 | 32.63 | 47.40 | 55.16 | 63.89 |
| Benzene, Vol. % | 21.75 | 20.60 | 17.50 | 11.44 | 7.80 | 7.11 | 4.15 |
| Toluene, Vol. % | 46.44 | 43.97 | 35.65 | 30.94 | 23.89 | 19.94 | 19.00 |
| Xylene, Vol. % | 18.43 | 17.45 | 15.35 | 18.27 | 15.74 | 13.54 | 8.69 |
| $C_9+$, Vol. % | 5.59 | 5.30 | 3.92 | 6.72 | 5.17 | 4.25 | 4.27 |
| Total | 100.00 | 100.00 | 100.00 | 100.00 | 100.00 | 100.00 | 100.00 |

While the invention has been described by specific examples and embodiments, there is no intent to limit the inventive concept except as set forth in the following claims.

We claim:

1. A process for converting an aliphatic hydrocarbon feedstream comprising paraffins to gasoline comprising the steps of:
    (a) heating said feedstream in a first heat exchange unit;
    (b) withdrawing said heated feedstream;
    (c) adding said feedstream to a first reaction zone containing zeolite catalyst whereby said zeolite catalyst is at least partially deactivated;
    (d) withdrawing an effluent from said first reaction zone comprising olefins, aromatics, and unreacted paraffins;
    (e) withdrawing said partially deactivated zeolite catalyst from said first reaction zone;
    (f) cooling said effluent in a second heat exchange unit;
    (g) withdrawing said cooled effluent;
    (h) adding said partially deactivated zeolite catalyst to a second reaction zone; and
    (i) adding said cooled effluent to said second reaction zone containing partially deactivated zeolite catalyst particles, whereby at least a portion of olefins present in the effluent are oligomerized.

2. A process according to claim 1 wherein the aliphatic hydrocarbon feedstream comprises a $C_2$–$C_6$ alkane or mixtures thereof.

3. A process according to claim 1 wherein a product comprising aromatic hydrocarbons is withdrawn from the second reaction zone.

4. A process according to claim 1 wherein said zeolite has a Constraint Index between 1 and 12.

5. A process according to claim 4 wherein said zeolite has the structure of ZSM-5, ZSM-11, ZSM-12, ZSM-22, ZSM-23, ZSM-35, or mixtures thereof.

6. A process according to claim 5 wherein said zeolite has the structure of ZSM-5.

7. A process according to claim 6 wherein said zeolite has the structure of Ga-ZSM-5.

8. A process according to claim 3 wherein the aromatic hydrocarbons comprise a majority of alkyl-substituted aromatic hydrocarbons.

9. A process according to claim 1 wherein a first auxiliary feedstream comprising oligomerizable $C_2$–$C_6$ olefins is added to the cooled effluent of step (f) prior to addition to the second reaction zone.

10. A process according to claim 9 wherein said first auxiliary feedstream is added to said effluent step (f) at temperature below that of said effluent of step (f).

11. A process according to claim 1 wherein the feedstream is added to the first reaction zone of step (c) at a temperature between 538° C. and 760° C. (1000° F. and 1400° F.), a pressure between 170 kPa and 2170 kPa (10 psig and 300 psig), and WHSV between 0.3 hr$^{-1}$ and 300 hr$^{-1}$ and the cooled effluent of step (f) is added to the second reaction zone of step (h) at a temperature between 149° C. and 288° C. (300° F. and 550° F.).

12. A process according to claim 9 wherein catalyst particles are withdrawn from the second reaction zone, reactivated in a continuous catalyst regeneration unit, and returned to the first reaction zone.

13. A process according to claim 10 wherein said first auxiliary feedstream is added at a temperature between 38° C. and 288° C. (100° F. and 550° F.).

14. A process according to claim 1 further comprising the steps of:
(a) withdrawing an intermediate product from said second reaction zone;
(b) cooling the intermediate product in a third heat exchange unit;
(c) withdrawing the cooled intermediate product; and
(d) adding the cooled intermediate product to a third reaction zone which comprises an aromatization zone containing partially deactivated zeolite catalyst particles.

15. A process according to claim 14 further comprising withdrawing a product comprising aromatic hydrocarbons from said third reaction zone.

16. A process according to claim 14 wherein said intermediate product of step (d) is added to said third reaction zone at a temperature between about 149° C. and 288° C. (300° C. (300° F. and 550° F.).

17. A process according to claim 16 wherein a second auxiliary feedstream comprising oligomerizable $C_2$-$C_6$ olefins is added to said cooled intermediate product prior to addition to said third reaction zone.

18. A process according to claim 17 wherein said second auxiliary feedstream is added at a temperature between 38° C. and 288° C. (100° F. and 580° F.).

19. A process according to claim 3 further comprising separating a paraffinic stream from said product stream and recycling said paraffinic stream to said first reaction zone of step (c).

* * * * *

UNITED STATES PATENT AND TRADEMARK OFFICE
CERTIFICATE OF CORRECTION

PATENT NO. : 4,879,424
DATED : November 7, 1989
INVENTOR(S) : M.N. Harandi

It is certified that error appears in the above-identified patent and that said Letters Patent is hereby corrected as shown below:

Col. 12, claim 16, line 15  delete "(300°C"

Signed and Sealed this

Sixth Day of November, 1990

Attest:

HARRY F. MANBECK, JR.

*Attesting Officer*  *Commissioner of Patents and Trademarks*